(12) United States Patent
Tian et al.

(10) Patent No.: US 9,753,497 B2
(45) Date of Patent: Sep. 5, 2017

(54) ELECTRONIC APPARATUS AND CONNECTING DEVICE

(71) Applicants: BEIJING LENOVO SOFTWARE LTD., Beijing (CN); LENOVO (BEIJING) LIMITED, Beijing (CN)

(72) Inventors: Shoudong Tian, Beijing (CN); Shaolian Liu, Beijing (CN); Wei Su, Beijing (CN)

(73) Assignees: BEIJING LENOVO SOFTWARE LTD., Beijing (CN); LENOVO (BEIJING) LIMITED, Beijing ( * ) Notice: Subject to any disclaimer, the term of this patent is extended or adjusted under 35 U.S.C. 154(b) by 153 days.

(21) Appl. No.: 14/640,600

(22) Filed: Mar. 6, 2015

(65) Prior Publication Data
US 2016/0048162 A1  Feb. 18, 2016

(30) Foreign Application Priority Data
Aug. 12, 2014  (CN) .......................... 2014 1 0395860

(51) Int. Cl.
G06F 1/16  (2006.01)
(52) U.S. Cl.
CPC ............ *G06F 1/166* (2013.01); *G06F 1/1616* (2013.01); *G06F 1/1626* (2013.01); *G06F 1/1681* (2013.01)
(58) Field of Classification Search
CPC ....... G06F 1/166; G06F 1/1626; G06F 1/1681
See application file for complete search history.

(56) References Cited

U.S. PATENT DOCUMENTS

| 9,329,636 B2* | 5/2016 | Ning ....................... G06F 1/166 |
| 2010/0149764 A1* | 6/2010 | Ueyama ................ G06F 1/1681 361/749 |

(Continued)

*Primary Examiner* — Hoa C Nguyen
*Assistant Examiner* — Keith Depew
(74) *Attorney, Agent, or Firm* — Scully Scott Murphy & Presser

(57) ABSTRACT

Disclosed are an electronic apparatus and a connecting device. The electronic apparatus includes a body; a supporting frame located at a back face of the body; a connecting device through which the supporting frame is rotatably connected with the body so that the supporting frame is unfolded by a predefined angle relative to the back face of the body and that the body is supported on the support surface through the supporting frame; the connecting device including: a first connecting part connected with the supporting frame; a second connecting part connected with the body; a rotary shaft; a first damping element; a second damping element; wherein in the case that the supporting frame is rotated, relative to the back face of the body, by the predefined angle around the rotary shaft in a first direction through the connecting device, the first damping element of the connecting device provides a first damping force against rotation in the first direction; in the case that the supporting frame is rotated, relative to the back face of the body, by the predefined angle around the rotary shaft in a second direction through the connecting device, the second damping element of the connecting device provides a second damping force against rotation in the second direction, the first direction is opposite to the second direction, and the first damping force is different from the second damping force.

14 Claims, 4 Drawing Sheets

(56) References Cited

U.S. PATENT DOCUMENTS

| | | | |
|---|---|---|---|
| 2012/0218691 A1* | 8/2012 | Minemura | G06F 1/1616 |
| | | | 361/679.01 |
| 2013/0170126 A1* | 7/2013 | Lee | G06F 1/1654 |
| | | | 361/679.17 |
| 2014/0273590 A1* | 9/2014 | Sharma | G06F 1/1669 |
| | | | 439/350 |
| 2014/0285960 A1* | 9/2014 | Sharma | G06F 1/1654 |
| | | | 361/679.28 |
| 2014/0312202 A1* | 10/2014 | Kuchler | F16M 13/00 |
| | | | 248/676 |
| 2015/0055012 A1* | 2/2015 | Zheng | G06F 1/1601 |
| | | | 348/373 |
| 2015/0055285 A1* | 2/2015 | Zheng | G06F 1/1656 |
| | | | 361/679.26 |
| 2015/0121654 A1* | 5/2015 | Novin | E05D 3/02 |
| | | | 16/273 |
| 2015/0124400 A1* | 5/2015 | Huang | G06F 1/1681 |
| | | | 361/679.55 |
| 2015/0378399 A1* | 12/2015 | Grinstead | G06F 1/1681 |
| | | | 361/679.09 |
| 2016/0054756 A1* | 2/2016 | Lan | G03B 21/145 |
| | | | 353/101 |

* cited by examiner

ELECTRONIC APPARATUS AND CONNECTING DEVICE

CROSS-REFERENCE TO RELATED APPLICATION

This application claims priority to Chinese patent application No. 201410395860.X filed Aug. 12, 2014, the entire contents of which are incorporated herein by reference.

BACKGROUND

Technical Field

The embodiments of the present disclosure relate to an electronic apparatus and a connecting device.

Related Art

Electronic apparatus usually have a rotary shaft structure which provides a first damping force in a first rotary direction when the shaft is rotated in the first rotary direction, and provides a second damping force in a second rotary direction opposite to the first rotary direction when the shaft is rotated in the second rotary direction. Because the rotary shaft structure is generally round and smooth, the first damping force is equal to the second damping force.

In many cases, the electronic apparatus needs to provide a rotary shaft structure in which the damping force in the first rotary direction is different from that in the second rotary direction.

SUMMARY

An electronic apparatus comprises a body, a supporting frame, and a connecting device through which the supporting frame is rotatably connected with the body; wherein the connecting device is configured to rotate in a first direction by overcoming a first damping force and is configured to rotate in a second direction opposite to the first direction by overcoming a second damping force different from the first damping force.

A connecting device comprises a first connecting part, a second connecting part, a rotary shaft, a first damping element, a second damping element, wherein, in the case that the first connecting part is rotated by a predefined angle around the rotary shaft in a first direction, the first damping element provides a first damping force against rotation in the first direction; in the case that the first connecting part is rotated by the predefined angle around the rotary shaft in a second direction, the second damping element provides a second damping force against rotation in the second direction, the first direction is opposite to the second direction, and the first damping force is different from the second damping force.

Also, an electronic apparatus comprises a first body, a second body, a connecting device through which the first body is rotatably connected with the second body, wherein the connecting device is configured to rotate in a first direction by overcoming a first damping force and is configured to rotate in a second direction opposite to the first direction by overcoming a second damping force different from the first damping force.

DETAILED DESCRIPTION OF EMBODIMENTS

Figure 1:
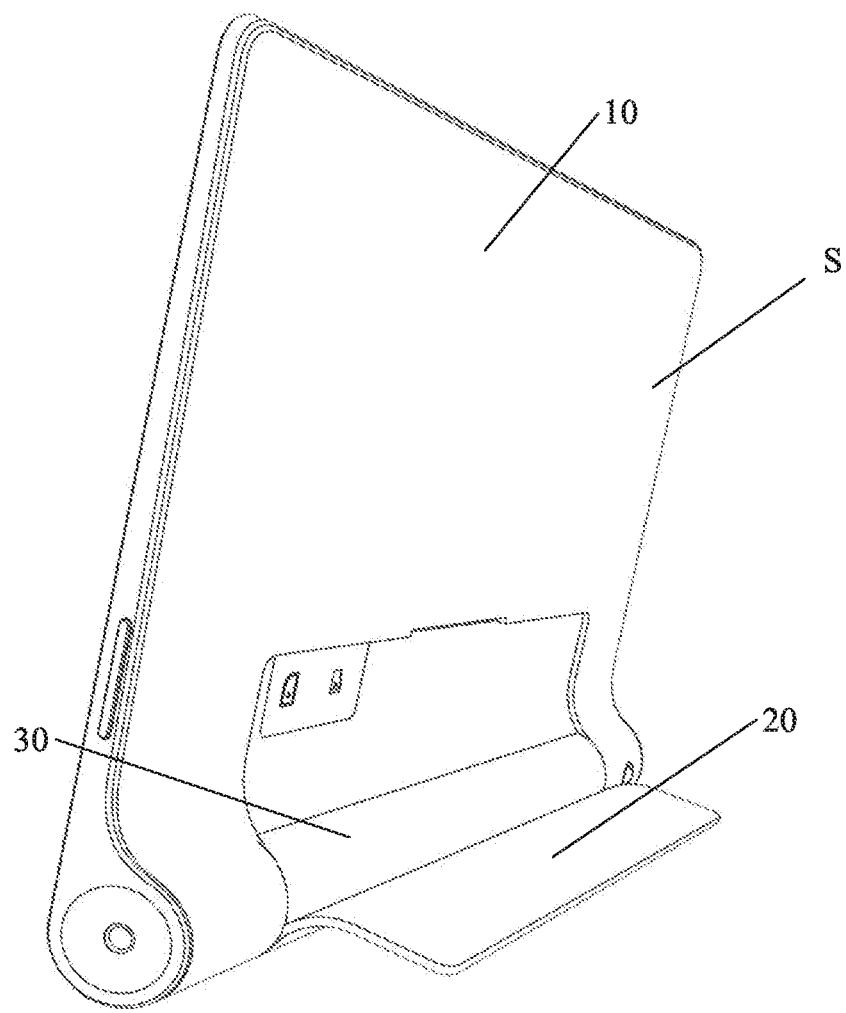
FIG. 1 is a structural schematic diagram of an electronic apparatus according to a first embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

For understanding the above-described technical solution better, the above-described technical solution is explained in detail in combination with the accompanying drawings of the specification and the specific implementation mode.

An electronic apparatus according to an exemplary embodiment of the present disclosure comprises: a body and a supporting frame; the front face of the body being provided with a touch screen, and the supporting frame being located at the back face of the body; wherein the supporting frame, when not used, can be stored at and flattened against the back face of the body. Here, the electronic apparatus is particularly a tablet computer.

The electronic apparatus further comprises a connecting device through which the supporting frame is rotatably connected with the body so that the supporting frame may be unfolded by a predefined angle relative to the back face of the body and that the body is supported on a support surface through the supporting frame. The supporting frame may be rotated by a certain angle relative to the back face of the body through the connecting device, and when the electronic apparatus is placed on the support surface, the electronic apparatus is supported by the supporting frame together with the body and then supported on the support surface, thus the user may operate the electronic apparatus without handholding it.

The connecting device includes: a first connecting part connected with the supporting frame; a second connecting part connected with the body; a rotary shaft; a first damping element; a second damping element; wherein, in the case that the supporting frame is rotated, relative to the back face of the body, by the predefined angle around the rotary shaft in a first direction through the connecting device, the first damping element of the connecting device provides a first damping force against rotation in the first direction; in the case that the supporting frame is rotated, relative to the back face of the body, by the predefined angle around the rotary shaft in a second direction opposite to the first direction through the connecting device, the second damping element of the connecting device provides a second damping force against rotation in the second direction, and the first damping force is different from the second damping force.

In the embodiment of the present disclosure, the first connecting part is fitted with the second connecting part through the first damping element and the second damping element, and the first damping force is provided to support the electronic apparatus after the supporting frame is rotated by the predefined angle in the first direction. When the supporting frame needs to be returned, the second damping force needs to be overcome in order that the supporting frame is rotated in the second direction to be returned to the back face of the body.

In the embodiment of the present disclosure, the first direction is a direction in which the supporting frame is unfolded by the predefined angle relative to the back face of the body through the connecting device; the second direction is a direction in which the supporting frame is folded by the predefined angle relative to the back face of the body through the connecting device; the first damping force which is provided by the first damping element to resist the rotation in the first direction is smaller than the second damping force which is provided by the second damping element to resist the rotation in the second direction.

In the embodiment of the present disclosure, after the connecting device is unfolded by the predetermined angle relative to the back face of the body, the first and second damping elements just abut against each other to provide a first damping force; and when the supporting frame needs to be returned to the back face of the body to flatten against the back face of the body, a second damping force is overcome to rotate the supporting frame in the second direction by the predetermined direction so that the supporting frame is flattened against the back face of the body.

In the embodiment of the present disclosure, the connecting device is used to provide a support force, by which the body is supported on a support surface through the supporting frame, when the supporting frame is unfolded by the predefined angle relative to the back face of the body; the support force is provided by the second damping element; and the support force is greater than or equal to the second damping force. When the first damping element and the second damping element abut against each other, a damping force to support the electronic apparatus on the support surface is provided by the interaction between the first damping element and the second damping element, so that the electronic apparatus is supported on the support surface and the user may operate the electronic apparatus without always handholding it.

In the embodiment of the present disclosure, the connecting device is used to provide a support force, by which the body is supported on the support surface through the supporting frame which is unfolded by any angle within a range of predefined angles, when the supporting frame is unfolded by any angle within the range of predefined angles relative to the back face of the body. That is to say, by providing more first damping elements and second damping elements on the first connecting part, and by providing the corresponding fitting structures on the second connecting part, the first connecting part can always abut against the second connecting part through the fitting between the fitting structures and the first and second damping elements, thus no matter how much the rotating angle of the supporting frame is, the corresponding damping force can always be provided for the electronic apparatus to support the electronic apparatus on the support surface.

In the embodiment of the present disclosure, the first connecting part is fixedly connected to the supporting frame, and the first connecting part is sleeved onto the rotary shaft and is stationary relative to the rotary shaft; the second connecting device is fixedly connected to the body, and the second connecting part is sleeved onto the rotary shaft and is rotatable relative to the rotary shaft; the first damping element is a first protrusion portion with a first inclination arranged at a first side of the first connecting part; the second damping element is a second protrusion portion with a second inclination arranged at the first side of the first connecting part, the face with the first inclination of the first protrusion portion and the face with the second inclination of the second protrusion portion form a first tooth space, wherein the first inclination is smaller than the second inclination, both the first inclination and the second inclination are angles relative to the axis of the rotary shaft; a first tooth is provided at a first side of the second connecting part, the first side of the second connecting part is opposite to the first side of the first connecting part, and the first tooth engages with the first tooth space. That is to say, both the first connecting part and the second connecting part have a tooth shaped structure, the corresponding support force is provided for the electronic apparatus by engaging the tooth on the first connecting part with the tooth on the second connecting part. Also, in the embodiment of the present disclosure, the angles of the inclined faces at two sides of the tooth of the first connecting part are different, that is, when the supporting frame is unfolded from the back face of the body, the tooth face having smaller inclined angle engages with the tooth of the second connecting part, the damping force is smaller at this moment; and when the supporting frame is folded to flatten against the back face of the body, the tooth face having larger inclined angle engages with the tooth of the second connecting part, the damping force is larger at this moment. With the solution according to the embodiment of the present disclosure, the electronic apparatus may be steadily supported, and the support force when the electronic apparatus is supported is larger than the force by which the supporting frame is unfolded, that is, the force by which the supporting frame is unfolded is smaller than the force by which the supporting frame is folded to flatten against the back face of the body.

In the embodiment of the present disclosure, the connecting device further comprises: a springback device which is sleeved onto the rotary shaft and arranged at a second side of the first connecting part; the springback device is used to provide the first damping force together with the face with the first inclination in the case that the supporting frame is rotated, relative to the back face of the body, by the predefined angle around the rotary shaft in the first direction through the connecting device, or to provide the second damping force together with the face with the second inclination in the case that the supporting frame is rotated, relative to the back face of the body, by the predefined angle around the rotary shaft in the second direction through the connecting device. In particular, the springback device may be a spring, the springback device may apply an axial force to the first connecting device and the second connecting device to make them be in a tight fit, thereby a greater damping force is provided.

In the embodiment of the present disclosure, the connecting device further comprises: a fitting part which is sleeved onto the rotary shaft and can rotate relative to the rotary shaft and move relative to the rotary shaft in an axial direction, and is arranged between the second side of the first connecting part and the springback device; wherein, a second tooth is provided at a first side of the fitting part; correspondingly, a third protrusion portion with a third inclination and a fourth protrusion portion with a fourth inclination are provided at the second side of the first connecting part, and a face with the third inclination of the third protrusion portion and a face with the fourth inclination of the fourth protrusion portion form a second tooth space; the second tooth space is offset with the first tooth space in the axis of the rotary shaft; the third inclination is equal or not equal to the fourth inclination, and both the third inclination and the fourth inclination are angles relative to the axis of the rotary shaft; the second side of the first connecting part is opposite to the first side of the fitting part, and the second tooth engages with the second tooth space.

In the embodiment of the present disclosure, the second tooth of the fitting part engages with the second tooth space arranged at the second side of the first connecting part, and the tooth space arranged at the second side of the first connecting part and the tooth space arranged at first side of the first connecting part are in a staggered distribution; when the supporting frame is rotated, the tooth spaces at both left and right sides of the first connecting part engage with the first tooth on the second connecting part and the second tooth on the fitting part alternately, so that the rotation of the first connecting device is smoother.

The embodiment of the present disclosure further provides a connecting device, the connecting device includes: a first connecting part; a second connecting part; a rotary shaft; a first damping element; a second damping element; wherein, in the case that the first connecting part is rotated by a predefined angle around the rotary shaft in a first direction, the first damping element provides a first damping force against rotation in the first direction; in the case that the first connecting part is rotated by the predefined angle around the rotary shaft in a second direction, the second damping element provides a second damping force against rotation in the second direction, the first direction is opposite to the second direction, and the first damping force is different from the second damping force.

It should be noted that the connecting device of the embodiment can be applied in the electronic apparatus capable of being unfolded and folded. For example, the connecting device may be applied in the rotary shaft of the notebook computer, or when the tablet computer has a supporting frame which can be unfolded and folded, in the supporting frame and a rotary shaft of the tablet computer.

The first connecting part is sleeved onto the rotary shaft and is stationary relative to the rotary shaft; the second connecting device is sleeved onto the rotary shaft and is rotatable relative to the rotary shaft; the first damping element is a first protrusion portion with a first inclination arranged at a first side of the first connecting part; the second damping element is a second protrusion portion with a second inclination arranged at the first side of the first connecting part, a face with the first inclination of the first protrusion portion and a face with the second inclination of the second protrusion portion form a first tooth space; and the first inclination is smaller than the second inclination, both the first inclination and the second inclination are angles relative to the axis of the rotary shaft; a first tooth is provided at a first side of the second connecting part, the first side of the second connecting part is opposite to the first side of the first connecting part, and the first tooth engages with the first tooth space.

It should be noted that the connecting device of this embodiment is totally the same as the above connecting device in the electronic apparatus.

In the embodiment of the present disclosure, the connecting device further comprises: a springback device which is sleeved onto the rotary shaft and arranged at a second side of the first connecting part; the springback device is used to provide the first damping force together with the face with the first inclination in the case that the first connecting part is rotated by the predefined angle around the rotary shaft in the first direction, or to provide the second damping force together with the face with the second inclination in the case that the supporting frame is rotated by the predefined angle around the rotary shaft in the second direction.

The springback device may be a resilient part such as spring for providing an axial force to the damping element of the first connecting device to make the damping element provide a greater support force.

In the embodiment of the present disclosure, the connecting device further comprises: a fitting part which is sleeved onto the rotary shaft and can rotate relative to the rotary shaft and move in an axial direction relative to the rotary shaft, and is arranged between the second side of the first connecting part and the springback device; a second tooth is provided at a first side of the fitting part; correspondingly, a third protrusion portion with a third inclination and a fourth protrusion portion with a fourth inclination are provided at the second side of the first connecting part, and a face with the third inclination of the third protrusion portion and a face with the fourth inclination of the fourth protrusion portion form a second tooth space; the third inclination is equal or not equal to the fourth inclination, and both the third inclination and the fourth inclination are angles relative to the axis of the rotary shaft; the second side of the second connecting part is opposite to the first side of the fitting part, and the second tooth engages with the second tooth space.

In the solutions of the embodiments of the present disclosure, the connecting device has the first damping element and the second damping element, and the first damping element is the first protrusion portion with the first inclination, the second damping element is the second protrusion portion with the second inclination, the face with the first inclination of the first protrusion portion and the face with the second inclination of the second protrusion portion form the tooth space; the tooth space engages with the tooth of another part. The applied force required when rotating in the first direction is totally different from the applied force required when rotating in the direction opposite to the first direction when the tooth space engages with the tooth, through two inclined faces with different inclination. As such, one structure may provide different damping forces in two different directions, such that the requirement of the loading force of the electronic apparatus in actual applications is satisfied, then better user experience of the electronic apparatus is obtained, and the electronic apparatus can be used more conveniently.

The embodiment of the present disclosure further provides an electronic apparatus. Here, the electronic apparatus is particularly a notebook computer, and the electronic apparatus includes: a first body; a second body; a connecting device through which the first body is rotatably connected with the second body so that the first body is unfolded by a predefined angle relative to the second body and that the second body is supported on a support surface through a supporting frame; the connecting device including: a first connecting part connected with the first body; a second connecting part connected with the second body; a rotary shaft; a first damping element; a second damping element; wherein, in the case that the first body is rotated, relative to the second body, by the predefined angle around the rotary shaft in a first direction through the connecting device, the first damping element of the connecting device provides a first damping force against rotation in the first direction; in the case that the first body is rotated, relative to a back face of the second body, by the predefined angle around the rotary shaft in a second direction through the connecting device, the second damping element of the connecting device provides a second damping force against rotation in the second direction, wherein the first direction is opposite to the second direction, and the first damping force is different from the second damping force.

In the embodiment of the present disclosure, the second body is provided with a keyboard when the first body is provided with a display screen; alternatively, the first body is provided with a keyboard when the second body is provided with a display screen. In this embodiment, the connecting device is applied in the electronic apparatus such as the notebook computer, and the above first embodiment of the electronic apparatus is an example in which the connecting device is applied in the tablet computer.

The inventive concepts of the solutions of the present disclosure will be further explained by describing the application state of the electronic apparatus according to the embodiments of the present disclosure.

FIG. 1 is a schematic diagram of the structure of an electronic apparatus according to a first embodiment of the present disclosure. As shown in FIG. 1, the electronic apparatus of the embodiment comprises: a body 10 and a supporting frame 20, the body 10 being connected to the supporting frame 20 through a connecting device 30; the front face of the body 10 being provided with a touch screen, and the supporting frame 20 being located at the back face of the body 10; the supporting frame 20 can be stored at and flattened against the back face of the body 10 when it does not support the electronic device. Here, the electronic apparatus is particularly a tablet computer.

The electronic apparatus further comprises: the connecting device 30 through which the supporting frame 20 is rotatably connected with the body 10 so that the supporting frame 20 may be unfolded by a predefined angle relative to the back face of the body 10 and that the body 10 is supported on the support surface S through the supporting frame 20, as shown in FIG. 1. The supporting frame 20 may be rotated by a certain angle relative to the back face of the body 10 through the connecting device 30, and when the electronic apparatus is placed on the support surface S, the electronic apparatus is supported by the supporting frame 20 together with the body 10 and then supported on the support surface S, thus the user may operate the electronic apparatus without handholding it.

The connecting device 30 comprises: a first connecting part 301 connected with the supporting frame 20, the connection thereof is not shown; a second connecting part 302 connected with the body 10, the connection thereof is not shown; a rotary shaft 303; a first damping element 305; a second damping element 304; during the supporting frame 20 is rotated, relative to the back face of the body 10, by the predefined angle around the rotary shaft in a first direction through the connecting device, the first damping element of the connecting device provides a first damping force which needs to be overcome during rotating in the first direction; during the supporting frame 20 is rotated, relative to the back face of the body 10, by the predefined angle around the rotary shaft in a second direction through the connecting device, the second damping element of the connecting device provides a second damping force which needs to be overcome during rotating in the second direction, the first direction is opposite to the second direction, and the first damping force is different from the second damping force.

In the embodiment of the present disclosure, the first connecting part is fitted with the second connecting part through the first damping element and the second damping element, and the first damping force is provided to support the electronic apparatus after the supporting frame 20 is rotated by the predefined angle in the first direction. When the supporting frame 20 needs to be returned, the second damping force needs to be overcome in order that the supporting frame 20 is rotated in the second direction to be returned to the back face of the body 10.

In the embodiment of the present disclosure, the first direction is a direction in which the supporting frame 20 is unfolded by the predefined angle through the connecting device 30 relative to the back face of the body 10; as shown in FIG. 1, it corresponds to a state in which the supporting frame 20 is unfolded through the connecting device 30 relative to the back face of the body 10. The unfolded angle depends on the specific structure of the first connecting device 301 and the second connecting device 302.

The second direction is a direction in which the supporting frame 20 is folded by the predefined angle through the connecting device 30 relative to the back face of the body 10; that is, the second direction is a direction in which the supporting frame 20 is folded to and flattened against the back face of the body 10.

The first damping force which is provided by the first damping element 305 to resist the rotation in the first direction is smaller than the second damping force which is provided by the second damping element 304 to resist the rotation in the second direction.

In the embodiment of the present disclosure, the first connecting part 301 is fixedly connected to the supporting frame 20, and the first connecting part 301 is sleeved onto the rotary shaft 303 and is stationary relative to the rotary shaft 303.

The second connecting device 302 is fixedly connected to the body 10, and the second connecting part 302 is sleeved onto the rotary shaft 303 and is rotatable relative to the rotary shaft 303.

The first damping element 305 is a first protrusion portion with a first inclination arranged at a first side of the first connecting part;

the second damping element 304 is a second protrusion portion with a second inclination arranged at the first side of the first connecting part, the face with the first inclination of the first protrusion portion and the face with the second inclination of the second protrusion portion form a first tooth space 312; and the first inclination is smaller than the second inclination, both the first inclination and the second inclination are an angle relative to the axis of the rotary shaft 303.

Figure 2A:
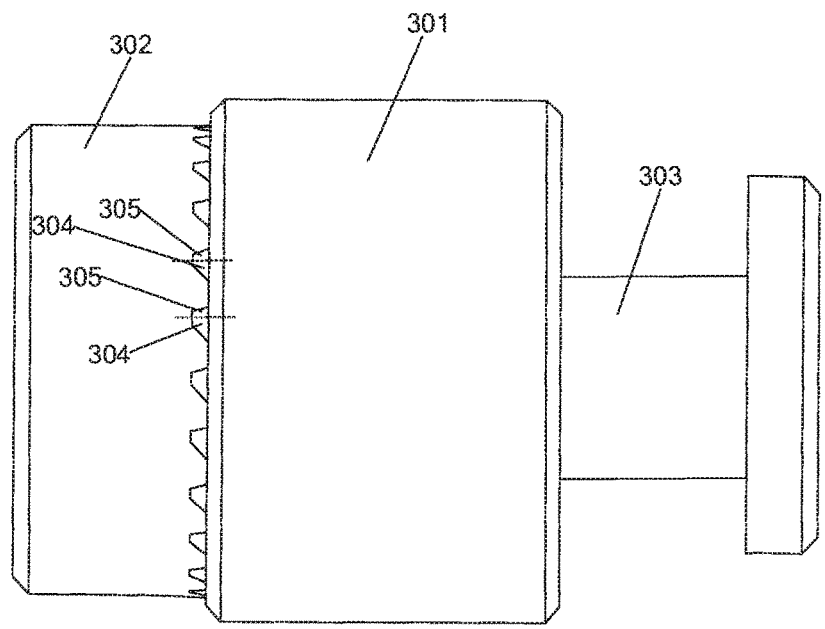
FIG. 2A is a structural schematic diagram of an electronic apparatus according to a second embodiment of the present disclosure.
Figure 2B:
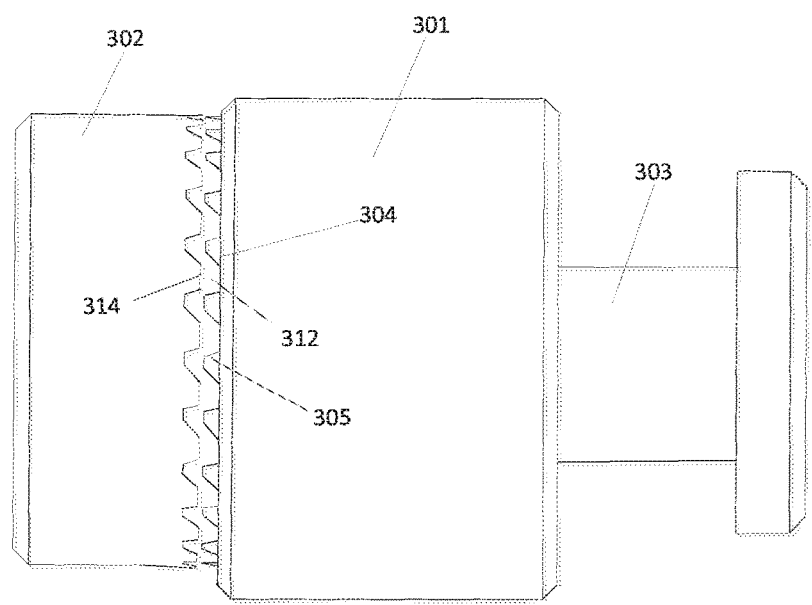
FIG. 2B is a partial structural schematic diagram f the electronic apparatus in FIG. 2A in a unassembled state.

A first tooth 314 is provided at a first side of the second connecting part 302, and the first side of the second connecting part 302 is opposite to the first side of the first connecting part; the first tooth 314 engages with the first tooth space 312, as shown in FIG. 2B.

The first side of the first connecting part 301 is the left side shown in FIG. 2A.

As shown in FIG. 2A, the first damping element 305 is an upper portion of the tooth portion above the dotted line at the left side of the first connecting part 301, and the second damping element 304 is a lower portion of the tooth portion below the dotted line at the left side of the first connecting part 301. The tooth space is formed between the first damping element 305 and the second damping element 304 and is just engaged with the tooth at the right side of the second connecting part 302. As supporting frame 20 is rotated, the first connecting part 301 is driven to rotate, then the second connecting part 302 is rotated as the first connecting part 301 is rotated due to the engagement of the tooth and the tooth space, thereby the body 10 of the electronic apparatus is driven to rotate.

As one implementation manner, the connecting device 30 is used to provide a support force, by which the body 10 is supported on a support surface through the supporting frame 20, when the supporting frame 20 is unfolded by the predefined angle relative to the back face of the body 10; the support force is provided by the second damping element 304; the support force is greater than or equal to the second damping force. In the implementation manner, only one pair of first damping element 305 and second damping force 304 is provided on the first connecting device 301 and forms the tooth space, correspondingly, only one tooth is provided on the second connecting part 302. When, and only when, the first connecting device is rotated by a predefined angle, the tooth of the second connecting part 302 just falls into the tooth space of the connecting part 301, and through the engagement between the tooth of the second connecting part 302 and the tooth space of the connecting part 301, the support force is provided for the electronic apparatus, such that the electronic apparatus is supported on the support surface.

As required, a number of pairs of first damping element 305 and second damping element 304 may also be provided on the first connecting part 301, correspondingly, a corresponding number of teeth are provided on the second connecting part 302, as such, only when the teeth on the second connecting part 302 are engaged with the tooth spaces on the first connecting part 301, the electronic apparatus can be supported by the supporting frame 20.

As another implementation manner, the connecting device 30 is used to provide a support force, by which the body 10 is supported on the support surface through the supporting frame 20 which is unfolded by any angle within a range of predefined angles, when the supporting frame 20 is unfolded by any angle within the range of predefined angles relative to the back face of the body 10. As shown in FIG. 2A, when a number of pairs of first damping element 305 and second damping element 304 are successively provided at the left side of the first connecting part 301 and a corresponding number of teeth are provided at the right side of the second connecting part 302, the teeth and the tooth spaces will stagger by one tooth or tooth space per rotation of the first connecting part 301, and because the teeth always engage with the tooth spaces, the support force is always provided for the electronic apparatus via the engagement of the teeth and tooth spaces, regardless of the rotating angle of the first connecting part 301.

As shown in FIG. 1, the electronic apparatus of the embodiment comprises: a body 10 and a supporting frame 20, the body 10 being connected to the supporting frame 20 through a connecting device 30; the front face of the body 10 being provided with a touch screen, and the supporting frame 20 being located at the back face of the body 10; the supporting frame 20 can be stored at and flattened against the back face of the body 10 when it does not support the electronic device. Here, the electronic apparatus is particularly a tablet computer.

The electronic apparatus further comprises: the connecting device 30 through which the supporting frame 20 is rotatably connected with the body 10 through the connecting device 30 so that the supporting frame 20 may be unfolded by a predefined angle relative to the back face of the body 10 and that the body 10 is supported on the support surface through the supporting frame 20, as shown in FIG. 1. The supporting frame 20 may be rotated by a certain angle relative to the back face of the body 10 through the connecting device 30, and when the electronic apparatus is placed on the support surface, the electronic apparatus is supported by the supporting frame 20 together with the body 10 and then supported on the support surface, thus the user may operate the electronic apparatus without handholding it.

Figure 3:
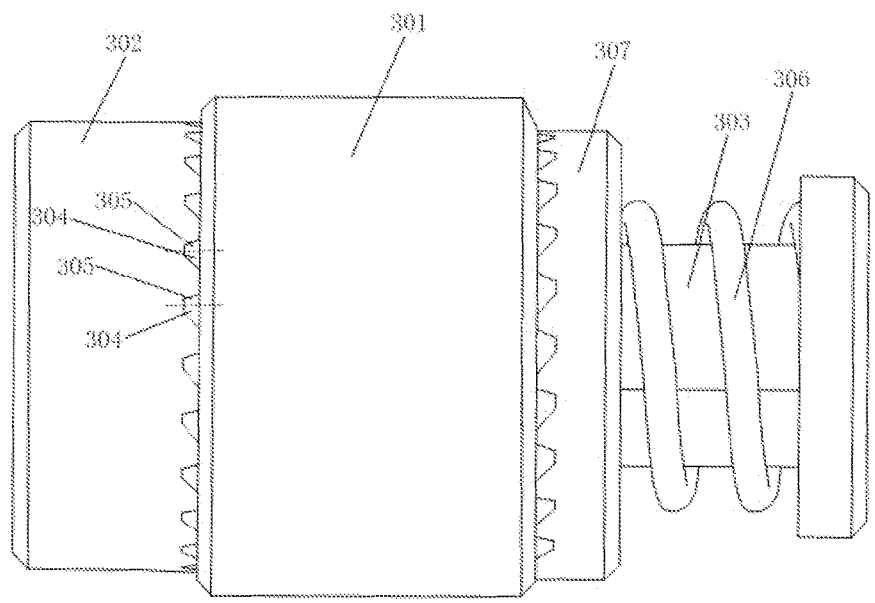
FIG. 3 is a structural schematic diagram of an electronic apparatus according to a third embodiment of the present disclosure.

As shown in FIG. 3, the connecting device 30 comprises: a first connecting part 301 connected with the supporting frame 20, the connection thereof is not shown; a second connecting part 302 connected with the body 10, the connection thereof is not shown; a rotary shaft 303; a first damping element 305; a second damping element 304; a springback 306; during the supporting frame 20 is rotated, relative to the back face of the body 10, by the predefined angle around the rotary shaft in a first direction through the connecting device, the first damping element of the connecting device providing a first damping force which needs to be overcome during rotating in the first direction; during the supporting frame 20 is rotated, relative to the back face of the body 10, by the predefined angle around the rotary shaft in a second direction through the connecting device, the second damping element of the connecting device provides a second damping force which needs to be overcome during rotating in the second direction, the first direction is opposite to the second direction, and the first damping force is different from the second damping force. In the embodiment of the present disclosure, the first connecting part is fitted with the second connecting part through the first damping element and the second damping element, and the first damping force is provided to support the electronic apparatus after the supporting frame 20 is rotated by the predefined angle in the first direction. When the supporting frame 20 needs to be returned, the second damping force needs to be overcome in order that the supporting frame 20 is rotated in the second direction to be returned to the back face of the body 10.

In the embodiment of the present disclosure, the springback device 306 is sleeved onto the rotary shaft 303 and is provided at a second side of the first connecting part 301, i.e. the right side of the first connecting part 301; the springback device 306 is used to provide the first damping force together with the face with the first inclination during the supporting frame 20 is rotated, relative to the back face of the body 10, by the predefined angle around the rotary shaft 303 in the first direction through the connecting device 30; or to provide the second damping force together with the face with the second inclination during the supporting frame 20 is rotated, relative to the back face of the body 10, by the predefined angle around the rotary shaft 303 in the second direction through the connecting device 30.

In the embodiment of the present disclosure, the springback device 306 comprises a spring structure, the springback device 306 is capable of providing an axial force for the first connecting device 301 to drive the first connecting part 301 to be always in a tight fit with the second connecting part 302 during a selection, preventing the first connecting part 301 from moving away from the second connecting part 302, thereby the first and second damping force are greater and the electronic apparatus is better supported on the support surface.

In the embodiment of the present disclosure, the first direction is a direction in which the supporting frame 20 is unfolded by the predefined angle through the connecting device 30 relative to the back face of the body 10; as shown in FIG. 1, it corresponds to a state in which the supporting frame 20 is unfolded through the connecting device 30 relative to the back face of the body 10. The unfolded angle depends on the specific structure of the first connecting device 301 and the second connecting device 302.

The second direction is a direction in which the supporting frame 20 is folded by the predefined angle through the connecting device 30 relative to the back face of the body 10; that is, the second direction is a direction in which the supporting frame 20 is folded to and flattened against the back face of the body 10.

The first damping force which is provided by the first damping element 305 to resist the rotation in the first direction is smaller than the second damping force which is provided by the second damping element 304 to resist the rotation in the second direction.

In the embodiment of the present disclosure, the first connecting part 301 is fixedly connected to the supporting frame 20, and the first connecting part 301 is sleeved onto the rotary shaft 303 and is stationary relative to the rotary shaft 303.

The second connecting device 302 is fixedly connected to the body 10, and the second connecting part 302 is sleeved onto the rotary shaft 303 and is rotatable relative to the rotary shaft 303.

The first damping element 305 is a first protrusion portion with a first inclination arranged at a first side of the first connecting part;

the second damping element 304 is a second protrusion portion with a second inclination arranged at the first side of the first connecting part, the face with the first inclination of the first protrusion portion and the face with the second inclination of the second protrusion portion form a first tooth space; and the first inclination is smaller than the second inclination, both the first inclination and the second inclination are an angle relative to the axis of the rotary shaft 303.

A first tooth is provided at a first side of the second connecting part 302, and the first side of the second connecting part 302 is opposite to the first side of the first connecting part; the first tooth engages with the first tooth space.

The first side of the first connecting part 301 is the left side shown in FIG. 3.

As shown in FIG. 3, the first damping element 305 is an upper portion of the tooth portion divided by the dotted line at the left side of the first connecting part 301, and the second damping element 304 is a lower portion of the tooth portion divided by the dotted line at the left side of the first connecting part 301. The tooth space is formed between the first damping element 305 and the second damping element 304 and is just engaged with the tooth at the right side of the second connecting part 302. As supporting frame 20 is rotated, the first connecting part 301 is driven to rotate, then the second connecting part 302 is rotated as the first connecting part 301 is rotated due to the engagement of the tooth and the tooth space, thereby the body 10 of the electronic apparatus is driven to rotate.

As one implementation manner, the connecting device 30 is used to provide a support force, by which the body 10 is supported on a support surface through the supporting frame 20, when the supporting frame 20 is unfolded by the predefined angle relative to the back face of the body 10; and the support force is provided by the second damping element 304; the support force is greater or equal to than the second damping force. In the implementation manner, only one pair of first damping element 305 and second damping force 304 is provided on the first connecting device 301 and forms the tooth space, correspondingly, only one tooth is provided on the second connecting part 302. When, and only when, the first connecting device is rotated by a predefined angle, the tooth of the second connecting part 302 just falls into the tooth space of the connecting part 301, and through the engagement between the tooth of the second connecting part 302 and the tooth space of the connecting part 301, the support force is provided for the electronic apparatus, such that the electronic apparatus is supported on the support surface.

As required, a number of pairs of first damping element 305 and second damping element 304 may also be provided on the first connecting part 301, correspondingly, a corresponding number of teeth are provided on the second connecting part 302, as such, only when the teeth on the second connecting part 302 are engaged with the tooth spaces on the first connecting part 301, the electronic apparatus can be supported by the supporting frame 20.

As another implementation manner, the connecting device 30 is used to provide a support force, by which the body 10 is supported on the support surface through the supporting frame 20 which is unfolded by any angle within a range of predefined angles, when the supporting frame 20 is unfolded by any angle within the range of predefined angles relative to the back face of the body 10. As shown in FIG. 3, when a number of pairs of first damping element 305 and second damping element 304 are successively provided at the left side of the first connecting part 301 and a corresponding number of teeth are provided at the right side of the second connecting part 302, the teeth and the tooth spaces will stagger by one tooth or tooth space per rotation of the first connecting part 301, and because the teeth always engage with the tooth spaces, the support force is always provided for the electronic apparatus via the engagement of the teeth and tooth spaces, regardless of the rotating angle of the first connecting part 301.

As shown in FIG. 1, the electronic apparatus of the embodiment comprises: a body 10 and a supporting frame 20, the body 10 being connected to the supporting frame 20 through a connecting device 30; the front face of the body 10 being provided with a touch screen, and the supporting frame 20 being located at the back face of the body 10; the supporting frame 20 can be stored at and flattened against the back face of the body 10 when it does not support the electronic device. Here, the electronic apparatus is particularly a tablet computer.

The electronic apparatus further comprises: the connecting device 30, the supporting frame 20 is rotatably connected with the body 10 through the connecting device 30 so that the supporting frame 20 may be unfolded by a predefined angle relative to the back face of the body 10 and that the body 10 is supported on the support surface through the supporting frame 20, as shown in FIG. 1. The supporting frame 20 may be rotated a certain angle relative to the back face of the body 10 through the connecting device 30, and when the electronic apparatus is placed on the support surface, the electronic apparatus is supported by the supporting frame 20 together with the body 10 and then supported on the support surface, thus the user may operate the electronic apparatus without handholding it.

Figure 4:
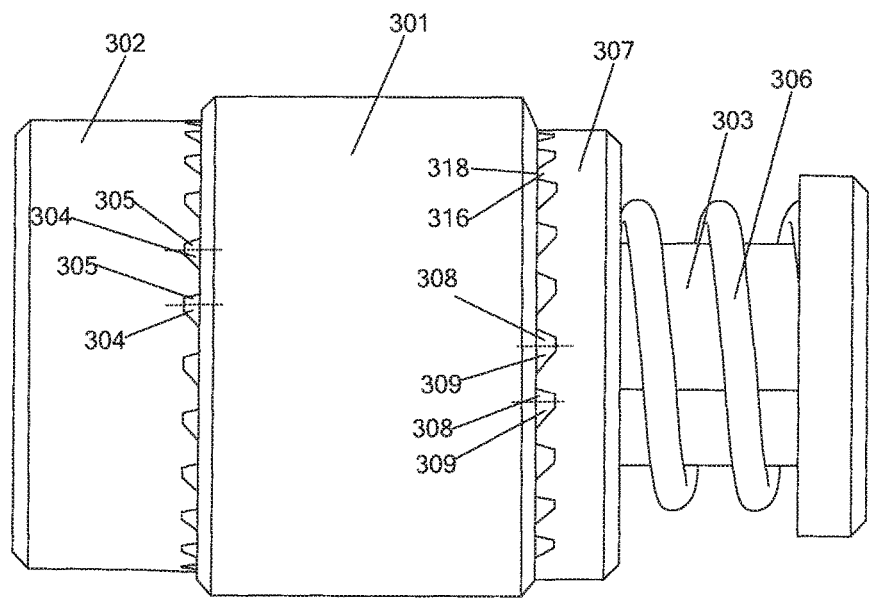
FIG. 4 is a structural schematic diagram of electronic apparatus according to a fourth embodiment of the present disclosure.

As shown in FIG. 4, the connecting device 30 comprises: a first connecting part 301 connected with the supporting frame 20, the connection thereof is not shown; a second connecting part 302 connected with the body 10, the connection thereof is not shown; a rotary shaft 303; a first damping element 305; a second damping element 304; a springback 306; a fitting part 307; during the supporting frame 20 is rotated, relative to the back face of the body 10, by the predefined angle around the rotary shaft in a first direction through the connecting device, the first damping element of the connecting device providing a first damping force which needs to be overcome during rotating in the first direction; during the supporting frame 20 is rotated, relative to the back face of the body 10, by the predefined angle around the rotary shaft in a second direction through the connecting device, the second damping element of the connecting device provides a second damping force which needs to be overcome during rotating in the second direction, the first direction is opposite to the second direction, and the first damping force is different from the second damping force. In the embodiment of the present disclosure, the first connecting part is fitted with the second connecting part through the first damping element and the second damping element, and the first damping force is provided to support the electronic apparatus after the supporting frame 20 is rotated by the predefined angle in the first direction. When the supporting frame 20 needs to be returned, the second damping force needs to be overcome in order that the supporting frame 20 is rotated in the second direction to be returned to the back face of the body 10.

In the embodiment of the present disclosure, the springback device 306 is sleeved onto the rotary shaft 303 and is provided at a second side of the first connecting part 301, i.e. the right side of the first connecting part 301; the springback device 306 is used to provide the first damping force together with the face with the first inclination during the supporting frame 20 is rotated, relative to the back face of the body 10, by the predefined angle around the rotary shaft 303 in the first direction through the connecting device 30; or to provide the second damping force together with the face with the second inclination during the supporting frame 20 is rotated, relative to the back face of the body 10, by the predefined angle around the rotary shaft 303 in the second direction through the connecting device 30.

In the embodiment of the present disclosure, the springback device 306 comprises a spring structure, the springback device 306 is capable of providing an axial force for the first connecting device 301 to drive the first connecting part 301 to be always in a tight fit with the second connecting part 302 during a selection, preventing the first connecting part 301 from moving away from the second connecting part 302, thereby the first and second damping force are greater and the electronic apparatus is better supported on the support surface.

In the embodiment of the present disclosure, the fitting part 307 is sleeved onto the rotary shaft 303 and can rotate relative to the rotary shaft 307 and move in an axial direction relative to the rotary shaft 307, and the fitting part 307 is arranged at a second side of the first connecting part 301, i.e. between the right side and the springback device 306; a second tooth 318 are provided at a first side, i.e. the left side, of the fitting part 307; correspondingly, a third protrusion portion 308 with a third inclination and a fourth protrusion portion 309 with a fourth inclination are provided at the second side, i.e. the right side in FIG. 4, of the first connecting part 301, a face with the third inclination of the third protrusion portion 308 and a face with the fourth inclination of the fourth protrusion portion 309 form a second tooth space 316; the second tooth space 316 is offset by a certain distance with the first tooth space 312 in the axis of the rotary shaft; that is, the second tooth space 316 and the first tooth space 312 are in a circumferential staggered distribution. Twenty four teeth may be provided at the left and right sides of the first connecting part 301 respectively, each spacing angle between adjacent teeth is 15 degree while the teeth at two sides are arranged at an offset 7.5 degree (corresponding to that an additional tooth is arranged at the intermediate position between the opposite teeth), such that the rotary scale is 7.5 degree when the first connecting part 301 is rotated, such a design may decrease the rotary scale effectively and extend the working life of the first connecting part 301. Also, through the continuous engagement between the tooth spaces of the first connecting part 301 and the teeth of the second connecting part 302 and the fitting part 307, the rotation between the first and second connecting parts 301, 302 and the fitting part 307 may be steadier. The third inclination is equal or not equal to the fourth inclination, and both the third inclination and the fourth inclination are angles relative to the axis of the rotary shaft.

The second side of the first connecting part 301, i.e. the right side, is opposite to the first side of the fitting part 307; and the second teeth engage with the second tooth spaces.

In the embodiment of the present disclosure, the first direction is a direction in which the supporting frame 20 is unfolded by the predefined angle through the connecting device 30 relative to the back face of the body 10; as shown in FIG. 1, it corresponds to a state in which the supporting frame 20 is unfolded through the connecting device 30 relative to the back face of the body 10. The unfolded angle depends on the specific structure of the first connecting device 301 and the second connecting device 302.

The second direction is a direction in which the supporting frame 20 is folded by the predefined angle through the connecting device 30 relative to the back face of the body 10; that is, the second direction is a direction in which the supporting frame 20 is folded to and flattened against the back face of the body 10.

The first damping force which is provided by the first damping element 305 to resist the rotation in the first direction is smaller than the second damping force which is provided by the second damping element 304 to resist the rotation in the second direction.

In the embodiment of the present disclosure, the first connecting part 301 is fixedly connected to the supporting frame 20, and the first connecting part 301 is sleeved onto the rotary shaft 303 and is stationary relative to the rotary shaft 303.

The second connecting device 302 is fixedly connected to the body 10, and the second connecting part 302 is sleeved onto the rotary shaft 303 and is rotatable relative to the rotary shaft 303.

The first damping element 305 is a first protrusion portion with a first inclination arranged at a first side of the first connecting part; the second damping element 304 is a second protrusion portion with a second inclination arranged at the first side of the first connecting part, the face with the first inclination of the first protrusion portion and the face with the second inclination of the second protrusion portion form a first tooth space; and the first inclination is smaller than the second inclination, both the first inclination and the second inclination are an angle relative to the axis of the rotary shaft 303.

A first tooth is provided at a first side of the second connecting part 302, and the first side of the second connecting part 302 is opposite to the first side of the first connecting part; the first tooth engages with the first tooth space.

The first side of the first connecting part 301 is the left side shown in FIG. 4.

As shown in FIG. 4, the first damping element 305 is an upper portion of the tooth portion divided by the dotted line at the left side of the first connecting part 301, and the second damping element 304 is a lower portion of the tooth portion divided by the dotted line at the left side of the first connecting part 301. The tooth space is formed between the first damping element 305 and the second damping element 304 and is just engaged with the tooth at the right side of the second connecting part 302. As supporting frame 20 is rotated, the first connecting part 301 is driven to rotate, then the second connecting part 302 is rotated as the first connecting part 301 is rotated due to the engagement of the tooth and the tooth space, thereby the body 10 of the electronic apparatus is driven to rotate.

As one implementation manner, the connecting device 30 is used to provide a support force by which the body 10 is supported on a support surface through the supporting frame 20, when the supporting frame 20 is unfolded by the predefined angle relative to the back face of the body 10; and the support force is provided by the second damping element 304; the support force is greater than or equal to the second damping force. In the implementation manner, only one pair of first damping element 305 and second damping force 304 is provided on the first connecting device 301 and forms the tooth space, correspondingly, only one tooth is provided on the second connecting part 302. When, and only when, the first connecting device is rotated by a predefined angle, the tooth of the second connecting part 302 just falls into the tooth space of the connecting part 301, and through the engagement between the tooth of the second connecting part 302 and the tooth space of the connecting part 301, the support force is provided for the electronic apparatus, such that the electronic apparatus is supported on the support surface.

As required, a number of pairs of first damping element 305 and second damping element 304 may also be provided on the first connecting part 301, correspondingly, a corresponding number of teeth are provided on the second connecting part 302, as such, only when the teeth on the second connecting part 302 are engaged with the tooth spaces on the first connecting part 301, the electronic apparatus can be supported by the supporting frame 20.

As another implementation manner, the connecting device 30 is used to provide a support force, by which the body 10 is supported on the support surface through the supporting frame 20 which is unfolded by any angle within a range of predefined angles, when the supporting frame 20 is unfolded by any angle within the range of predefined angles relative to the back face of the body 10. As shown in FIG. 4, when a number of pairs of first damping element 305 and second damping element 304 are successively provided at the left side of the first connecting part 301 and a corresponding number of teeth are provided at the right side of the second connecting part 302, the teeth and the tooth spaces will stagger by one tooth or tooth space per rotation of the first connecting part 301, and because the teeth always engage with the tooth spaces, the support force is always provided for the electronic apparatus via the engagement of the teeth and tooth spaces, regardless of the rotating angle of the first connecting part 301.

The embodiment of the present disclosure further provides a connecting device, the connecting device includes: a first connecting part; a second connecting part; a rotary shaft; a first damping element; a second damping element; during the first connecting part is rotated by a predefined angle around the rotary shaft in a first direction, the first damping element provides a first damping force which needs to be overcome during rotating in the first direction; during the first connecting part is rotated by the predefined angle around the rotary shaft in a second direction, the second damping element provides a second damping force which needs to be overcome during rotating in the second direction, the first direction is opposite to the second direction, and the first damping force is different from the second damping force.

It should be noted that the connecting device of the embodiment can be applied in the electronic apparatus capable of being unfolded and folded. For example, the connecting device may be applied in the rotary shaft of the notebook computer, or when the tablet computer has a supporting frame which can be unfolded and folded, in the supporting frame and a rotary shaft of the tablet computer.

The first connecting part is sleeved onto the rotary shaft and is stationary relative to the rotary shaft; the second connecting device is sleeved onto the rotary shaft and is rotatable relative to the rotary shaft; the first damping element is a first protrusion portion with a first inclination arranged at a first side of the first connecting part; the second damping element is a second protrusion portion with a second inclination arranged at the first side of the first connecting part, a face with the first inclination of the first protrusion portion and a face with the second inclination of the second protrusion portion form a first tooth space; and the first inclination is smaller than the second inclination, both the first inclination and the second inclination are angles relative to the axis of the rotary shaft; a first tooth is provided at a first side of the second connecting part, the first side of the second connecting part is opposite to the first side of the first connecting part, and the first tooth engages with the first tooth space.

It should be noted that the connecting device of this embodiment is totally the same as the above connecting device in the electronic apparatus.

In the embodiment of the present disclosure, the connecting device further comprises: a springback device which is sleeved onto the rotary shaft and arranged at a second side of the first connecting part; the springback device is used to provide the first damping force together with the face with the first inclination during the first connecting part is rotated by the predefined angle around the rotary shaft in the first direction, or to provide the second damping force together with the face with the second inclination during the supporting frame is rotated by the predefined angle around the rotary shaft in the second direction.

The springback device may be a resilient part such as spring for providing an axial force to the damping element of the first connecting device to make the damping element provide a greater support force.

In the embodiment of the present disclosure, the connecting device further comprises: a fitting part which is sleeved onto the rotary shaft and can rotate relative to the rotary shaft and move in an axial direction relative to the rotary shaft, and is arranged between the second side of the first connecting part and the springback device; a second tooth is provided at a first side of the fitting part; correspondingly, a third protrusion portion with a third inclination and a fourth protrusion portion with a fourth inclination are provided at the second side of the first connecting part, and a face with the third inclination of the third protrusion portion and a face with the fourth inclination of the fourth protrusion portion form a second tooth space; the third inclination is equal or not equal to the fourth inclination, and both the third inclination and the fourth inclination are angles relative to the axis of the rotary shaft; the second side of the second connecting part is opposite to the first side of the fitting part, and the second tooth engages with the second tooth space.

It should be noted that the specific structure of the connecting device is shown in FIGS. 2-4 and the detailed description thereof is omitted.

Figure 5:
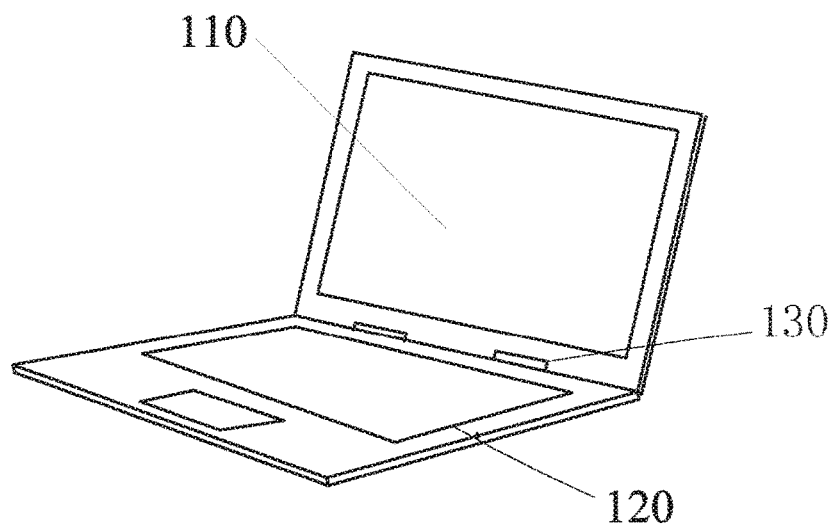
FIG. 5 is a structural schematic diagram of an electronic apparatus according to a fifth embodiment of the present disclosure.

FIG. 5 is a schematic diagram of the structure of an electronic apparatus according to a second embodiment of the present disclosure. As shown in FIG. 5, the electronic apparatus of the embodiment comprises a first body 110, a second body 120 and a connecting device 130, the first body 110 is rotatably connected to the second body 120 through the connecting device 130 so that the first body 110 may be unfolded by a predefined angle relative to the second body 120 and that the second body 120 is supported on the support surface through the supporting frame.

The connecting device comprises: a first connecting part connected with the first body; a second connecting part connected with the second body; a rotary shaft; a first damping element; a second damping element; during the first body 110 is rotated, relative to the back face of the second body 120, by the predefined angle around the rotary shaft in a first direction through the connecting device, the first damping element of the connecting device providing a first damping force which needs to be overcome during rotating in the first direction; during the first body 110 is rotated, relative to the back face of the second body 120, by the predefined angle around the rotary shaft in a second direction through the connecting device, the second damping element of the connecting device provides a second damping force which needs to be overcome during rotating in the second direction, the first direction is opposite to the second direction, and the first damping force is different from the second damping force.

It should be noted that the electronic apparatus is a notebook computer, and its connecting device 130 is totally the same as the connecting device 30 of the above tablet computer. Thus, the structure of the connecting device 130 may refer to the specific structures shown in FIGS. 2-4 and the detailed description thereof is omitted.

The solutions embodied in the above embodiments of the present disclosure may be combined in any manner as long as there is no confliction between the combined solutions.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An electronic apparatus comprising:
   a body;
   a supporting frame; and
   a connecting device through which the supporting frame is rotatably connected with the body;
   wherein the connecting device is configured to rotate in a first direction by overcoming a first damping force and is configured to rotate in a second direction opposite to the first direction by overcoming a second damping force different from the first damping force,
   wherein the connecting device comprises a first damping element configured to provide the first damping force and a second damping element configured to provide the second damping force,
   wherein the connecting device further comprises a first connecting part connected with the supporting frame, a second connecting part connected with the body, and a rotary shaft, and
   wherein:
   the first connecting part is fixedly connected to the supporting frame, and the first connecting part is sleeved onto the rotary shaft and is stationary relative to the rotary shaft;
   the second connecting part is fixedly connected to the body, and the second connecting part is sleeved onto the rotary shaft and is rotatable relative to the rotary shaft;
   the first damping element is a first protrusion portion with a first inclination arranged at a first side of the first connecting part;
   the second damping element is a second protrusion portion with a second inclination arranged at the first side of the first connecting part, the face with the first inclination of the first protrusion portion and the face with the second inclination of the second protrusion portion form a first tooth space, wherein the first inclination is smaller than the second inclination, both the first inclination and the second inclination are angles relative to the axis of the rotary shaft; and
   a first tooth is provided at a first side of the second connecting part, the first side of the second connecting part is opposite to the first side of the first connecting part, and the first tooth engages with the first tooth space.

2. The electronic apparatus according to claim 1, wherein the supporting frame is located at a back face of the body and is capable of being unfolded by a predefined angle relative to the back face of the body, so that the body is supported on the support surface through the supporting frame.

3. The electronic apparatus according to claim 2, wherein,
   in the case that the supporting frame is rotated, relative to the back face of the body, by the predefined angle around the rotary shaft in the first direction through the connecting device, the first damping element of the connecting device provides the first damping force against rotation in the first direction;
   in the case that the supporting frame is rotated, relative to the back face of the body, by the predefined angle around the rotary shaft in the second direction through the connecting device, the second damping element of the connecting device provides the second damping force against rotation in the second direction.

4. The electronic apparatus according to claim 3, wherein,
   the first direction is a direction in which the supporting frame is unfolded by the predefined angle relative to the back face of the body through the connecting device;
   the second direction is a direction in which the supporting frame is folded by the predefined angle relative to the back face of the body through the connecting device;
   the first damping force which is provided by the first damping element to resist the rotation in the first direction is smaller than the second damping force which is provided by the second damping element to resist the rotation in the second direction.

5. The electronic apparatus according to claim 4, wherein,
   the connecting device is used to provide a support force, by which the body is supported on a support surface through the supporting frame, when the supporting frame is unfolded by the predefined angle relative to the back face of the body;
   the support force is provided by the second damping element; and
   the support force is greater than or equal to the second damping force.

6. The electronic apparatus according to claim 4, wherein,
the connecting device is used to provide a support force, by which the body is supported on the support surface through the supporting frame which is unfolded by any angle within the predefined angle, when the supporting frame is unfolded by any angle within the predefined angle relative to the back face of the body.

7. The electronic apparatus according to claim 6, wherein,
the first connecting part is fixedly connected to the supporting frame, and the first connecting part is sleeved onto the rotary shaft and is stationary relative to the rotary shaft;
the second connecting device is fixedly connected to the body, and the second connecting part is sleeved onto the rotary shaft and is rotatable relative to the rotary shaft;
the first damping element is a first protrusion portion with a first inclination arranged at a first side of the first connecting part;
the second damping element is a second protrusion portion with a second inclination arranged at the first side of the first connecting part, the face with the first inclination of the first protrusion portion and the face with the second inclination of the second protrusion portion form a first tooth space; and the first inclination is smaller than the second inclination, both the first inclination and the second inclination are angles relative to the axis of the rotary shaft;
a first tooth is provided at a first side of the second connecting part, the first side of the second connecting part is opposite to the first side of the first connecting part, and the first tooth engages with the first tooth space.

8. The electronic apparatus according to claim 1, wherein,
the connecting device further comprises a springback device which is sleeved onto the rotary shaft and arranged at a second side of the first connecting part;
the springback device is used to provide the first damping force together with the face with the first inclination during the supporting frame is rotated, relative to the back face of the body, by the predefined angle around the rotary shaft in the first direction through the connecting device, or to provide the second damping force together with the face with the second inclination during the supporting frame is rotated, relative to the back face of the body, by the predefined angle around the rotary shaft in the second direction through the connecting device.

9. The electronic apparatus according to claim 8, wherein,
the connecting device further comprises: a fitting part which is sleeved onto the rotary shaft and is capable of rotating relative to the rotary shaft and move relative to the rotary shaft in an axial direction, and is arranged between the second side of the first connecting part and the springback device;
wherein,
a second tooth is provided at a first side of the fitting part; correspondingly, a third protrusion portion with a third inclination and a fourth protrusion portion with a fourth inclination are provided at the second side of the first connecting part, and a face with the third inclination of the third protrusion portion and a face with the fourth inclination of the fourth protrusion portion form a second tooth space; the second tooth space is offset with the first tooth space in the axis of the rotary shaft; the third inclination is equal or not equal to the fourth inclination, and both the third inclination and the fourth inclination are angles relative to the axis of the rotary shaft;
the second side of the first connecting part is opposite to the first side of the fitting part, and the second tooth engages with the second tooth space.

10. A connecting device comprising:
a first connecting part;
a second connecting part;
a rotary shaft;
a first damping element;
a second damping element;
wherein,
in the case that the first connecting part is rotated by a predefined angle around the rotary shaft in a first direction, the first damping element provides a first damping force against rotation in the first direction;
in the case that the first connecting part is rotated by the predefined angle around the rotary shaft in a second direction, the second damping element provides a second damping force against rotation in the second direction, the first direction is opposite to the second direction, and the first damping force is different from the second damping force,
wherein,
the first connecting part is sleeved onto the rotary shaft and is stationary relative to the rotary shaft;
the second connecting part is sleeved onto the rotary shaft and is rotatable relative to the rotary shaft;
the first damping element is a first protrusion portion with a first inclination arranged at a first side of the first connecting part;
the second damping element is a second protrusion portion with a second inclination arranged at the first side of the first connecting part, a face with the first inclination of the first protrusion portion and a face with the second inclination of the second protrusion portion form a first tooth space, the first inclination is smaller than the second inclination, and both the first inclination and the second inclination are angles relative to the axis of the rotary shaft; and
a first tooth is provided at a first side of the second connecting part, the first side of the second connecting part is opposite to the first side of the first connecting part, and the first tooth engages with the first tooth space.

11. The connecting device according to claim 10, wherein,
the connecting device further comprises:
a springback device which is sleeved onto the rotary shaft and arranged at a second side of the first connecting part;
the springback device is used to provide the first damping force together with the face with the first inclination during the first connecting part is rotated by the predefined angle around the rotary shaft in the first direction, or to provide the second damping force together with the face with the second inclination during the supporting frame is rotated by the predefined angle around the rotary shaft in the second direction.

12. The connecting device according to claim 11, wherein,
the connecting device further comprises
a fitting part which is sleeved onto the rotary shaft and is capable of rotating relative to the rotary shaft and move in an axial direction relative to the rotary shaft, and is arranged between the second side of the first connecting part and the springback device;

a second tooth is provided at a first side of the fitting part; correspondingly, a third protrusion portion with a third inclination and a fourth protrusion portion with a fourth inclination are provided at the second side of the first connecting part, and a face with the third inclination of the third protrusion portion and a face with the fourth inclination of the fourth protrusion portion form a second tooth space; the third inclination is equal or not equal to the fourth inclination, and both the third inclination and the fourth inclination are angles relative to the axis of the rotary shaft;

the second side of the second connecting part is opposite to the first side of the fitting part, and the second tooth engages with the second tooth space.

13. An electronic apparatus comprising:
a first body;
a second body;
a connecting device through which the first body is rotatably connected with the second body;
wherein the connecting device is configured to rotate in a first direction by overcoming a first damping force and is configured to rotate in a second direction opposite to the first direction by overcoming a second damping force different from the first damping force,
wherein the connecting device comprises a first damping element configured to provide the first damping force and a second damping element configured to provide the second damping force,
wherein the connecting device further comprises a first connecting part connected with the first body, a second connecting part connected with the second body, and a rotary shaft, wherein:
the first connecting part is fixedly connected to the supporting frame, and the first connecting part is sleeved onto the rotary shaft and is stationary relative to the rotary shaft;
the second connecting part is fixedly connected to the body, and the second connecting part is sleeved onto the rotary shaft and is rotatable relative to the rotary shaft;
the first damping element is a first protrusion portion with a first inclination arranged at a first side of the first connecting part;
the second damping element is a second protrusion portion with a second inclination arranged at the first side of the first connecting part, the face with the first inclination of the first protrusion portion and the face with the second inclination of the second protrusion portion form a first tooth space, wherein the first inclination is smaller than the second inclination, both the first inclination and the second inclination are angles relative to the axis of the rotary shaft; and
a first tooth is provided at a first side of the second connecting part, the first side of the second connecting part is opposite to the first side of the first connecting part, and the first tooth engages with the first tooth space.

14. The electronic apparatus according to claim 13, wherein the first body is rotatably connected with the second body through the connecting device, so that the first body is unfolded by a predefined angle relative to the second body and that the second body is supported on a support surface through a supporting frame.

* * * * *